Figure 1:
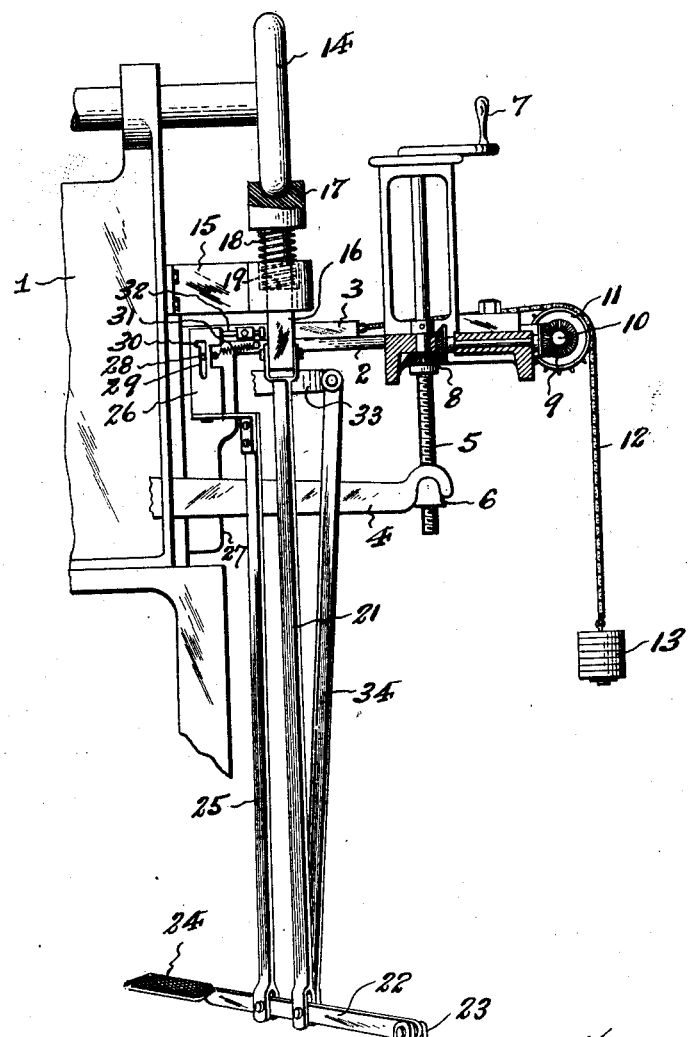

Feb. 14, 1928.

G. DAVIS 1,659,020

FILE CUTTING MACHINE

Filed May 17, 1927

2 Sheets-Sheet 1

INVENTOR
George Davis,
BY
George D. Richards
ATTORNEY

Feb. 14, 1928.  1,659,020
G. DAVIS
FILE CUTTING MACHINE
Filed May 17, 1927  2 Sheets-Sheet 2
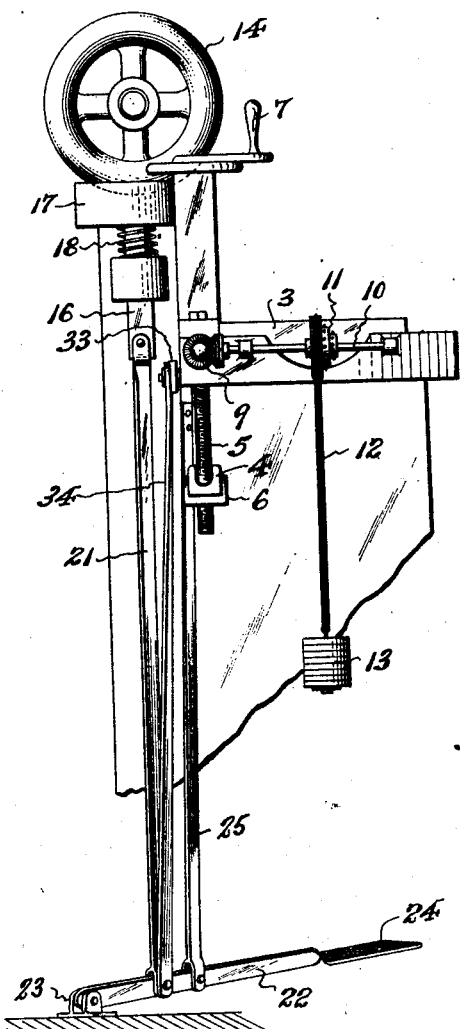
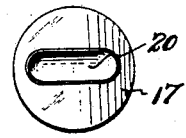
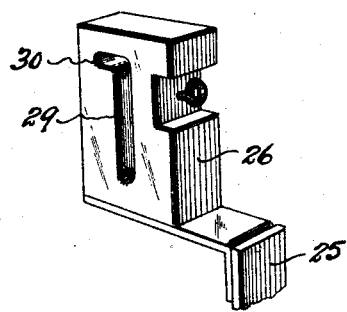
INVENTOR
George Davis,
BY
George D. Richards
ATTORNEY Patented Feb. 14, 1928.

1,659,020

UNITED STATES PATENT OFFICE.

GEORGE DAVIS, OF NEWARK, NEW JERSEY.

FILE-CUTTING MACHINE.

Application filed May 17, 1927. Serial No. 192,040.

The present invention relates to improvements in machines for cutting metal files; and the invention has reference, more particularly, to that type of file cutting machine which is used to make a file having a handle or a handle shank integral therewith and on which the file cutting is made in progressive steps toward the handle part and discontinues at or near the handle part, and the invention relates to automatic mechanism for braking and stopping the cutting mechanism and for shutting off the driving power of the machine.

The invention still further relates to machines of the type described which are adapted to cut a file which varies in width along the cut surface and are adapted to apply a power stroke which varies in strength in accordance with the width of the surface to be cut to secure cuts of uniform depth, the invention referring more particularly in this respect to automatic actuating connection between a movable blank carrier and means for varying the strength of the cutting power. The invention is applicable to file cutting machines generally.

An object of the invention is to provide a file cutting machine having automatic means for braking and stopping the operating parts thereof at a predetermined stage of the cutting operation and for cutting off the source of actuating power of the machine.

Another object of the invention is to provide an automatic machine which will cut a file of varying width and in which the cuts are uniform in depth throughout a given file and in a number of files cut by the machine, and which machine will produce the same number of cuts or a cut surface of the same length in a number of files cut thereby.

Other objects and advantages of the invention will appear from the drawings and the following description of a machine embodying the invention; and the invention consists of the new and useful arrangements and combinations of parts set forth in the claims forming part of this application.

The present invention is an improvement on file cutting machines of the type of which that shown in U. S. Patent No. 975,236, issued November 8, 1910, and in United States Patent No. 1,465,434, issued August 21, 1923, to John A. Hess is an example. This type of machine is well known to those familiar in the file cutting art and reference is hereby made to the cited patent for a consideration of parts and functions generally known. These machines are adapted for cutting a file surface whose width varies along its length and particularly for cutting finger nail files which are generally flat, have a handle portion at one end, and have their sides tapering toward a point away from the handle, the cuts being inclined inwardly into the metal and toward the handle end. The cutting operation is commenced at the narrow end and proceeds toward the handle where it is discontinued at or near a given distance from the handle. It is desired or required that the cuts throughout the file be of uniform depth; and that in any batch of files made the cut portion be uniform in length, which generally means that the cutting is commenced at a given point from the end of the file and is discontinued at a given uniform distance from the handle. Heretofore the control of the amount of cutting power and the stopping of the blank feed and cutting off of the power at the end of the operation has been done by hand mechanism and expert workmen having long training and experience were required to turn out files which are uniform.

In the machines of the type of which reference is made a heavy spring or a body of compressible rubber is used to impart driving power to the file cutter, the spring or rubber being compressed by a cam before each cutting stroke and then released to permit it to move the cutter. A lever extending to a hand control is used to vary the compression whereby to vary the driving power imparted to the cutter in accordance with the width of the blank at the point of any given cut. This is necessary because the amount of metal cut at each point varies in a tapered file having cuts of uniform depth. A hand control is also used to stop the machine at the end of an operation, this control being in the form of a hand brake wheel. A hand or foot lever is generally used for shutting power off the machine at the time the braking is applied.

According to the present invention movement of a file blank holding member is utilized to automatically actuate a power varying lever to progressively vary the cutting power applied to a tapered file blank and the movement is also utilized to automatically brake and stop the power applying parts and to disconnect the power from moving parts of the machine.

The invention is clearly illustrated in the accompanying drawings showing somewhat diagrammatically an embodiment thereof and in which:—

Figure 1 is a side elevation view of part of a file cutting machine showing the improvements of the invention; Figure 2 is a front elevation view of the same; Figure 3 is a plan view of a brake shoe; and Figure 4 is a perspective view of a latch member.

In the drawings the frame or body 1 supports the horizontal bed plate 2 over which slides the file blank carrier 3. Means, not shown but well known in the art, is included in the machine for moving said carrier 3 in a progressive step by step motion toward the body of the machine with successive periods of rest between steps. These machines comprise also a file cutting tool and means for applying power thereto to impart motion to the cutter in a direction toward the file blank carrier, said power applying means being operative to apply cutting movement during each successive period of rest of said carrier. The power applied at successive strokes of the cutter is varied by the means generally described above, and because it is a common and well known part or combination in machines of this kind the means is not shown herein except that there is shown a horizontal lever 4 which is movable about a fulcrum to vary the strength of the cutting stroke. A vertical screw 5 journaled for free rotation in said plate 2 carries a nut 6 which registers in a slot or groove in the lower side of lever 4 at the outer end thereof. A handle member 7 on said screw 5 serves to turn the screw to impart motion to said lever 4 to increase or decrease the pressure on the compression spring or rubber above described; the compression of the spring or rubber serves to keep the end of lever 4 in contact against said nut 6.

A train of bevel gears 8 and 9, connects said screw 5 in driven relation with a shaft 10 mounted on said plate 2 horizontally across the direction of movement of said carrier 3. Said shaft 10 carries a set of sprocket wheels 11 of different diameters and a sprocket chain 12 connecting at one end to said carrier 3 and a carrying weight 13 engages one of said wheels 11 and serves through said bevel gears 8, 9 to rotate said screw 5 and thereby move said lever 4 in successive steps through actuation by the step by step movement of said carrier 3 in moving a file blank in a direction toward the frame 1. Said sprocket wheels 11 are preferably splined for longitudinal movement along said shaft 10 to accommodate engagement of any one of them at will with said driving chain 12, and various amounts or degrees of movement of said lever 4 to said different sizes or shapes of file blanks can be secured by making selective use of said wheels 11. The driving or motive power for the cutting tool and for moving the carrier 3 is preferably applied by means of rotating parts not shown and to which is connected a braking wheel 14 which is adapted for either hand or automatic braking. A bracket 15 extending forwardly from frame 1 below wheel 14 carries a slide member 16 which extends vertically therethrough and which carries a brake shoe 17 on its upper end. A compression spring 18 bearing at one end against the bottom of a depression 19 in said bracket 15 and at its other end against the bottom of said shoe 17 tends to move said shoe 17 against said wheel 14, an arcuate depression 20 being formed into the upper surface of said shoe 17 to fit the contour of wheel 14 and provide sufficient surface for braking contact. An arm or rod 21 pivoted to the lower end of slide member 16 pivotally connects with an intermediate point on a treadle lever 22 which latter at one end is pivoted to the floor through the clevis 23 and at the other end carries a pedal 24.

An upwardly extending arm or rod 25 pivoted at its lower end to said treadle lever 22 carries at its upper end a latch member 26 which is slidable vertically against the side of a bracket 27. A pin 28 extends laterally from the side of bracket 27 and through a vertical slot 29 which extends from one side to the other through said latch member 26. From the upper end of said slot 29 there extends rearwardly a horizontal slot 30 and a tension spring 31 connected at one end to said latch member 26 and extending forwardly and connected at its other end to said plate 2 tends to hold the rear wall of said slot 29 against said pin 28 and to move said latch member 26 about the pivot of said connecting rod 25 when said slot 30 is opposite said pin 28. This latch arrangement and its connection to brake shoe 17 through said lever 22 permits the locking of said brake shoe 17 in a position out of engagement with said wheel 14 by engaging said slot 30 with said pin 28, and also permits said spring 18 to move said shoe 17 into braking relation with wheel 14 when member 26 is moved against the tension of spring 31 to bring slot 30 out of engagement with said pin 28. The details of the functions and operation of these and other parts are fully set forth hereinafter in a description of the operation of the machine.

Said blank carrier 3 carries on its side nearest member 26 a screw pin 32 which extends horizontally in a rearwardly direction, is adjustable, and has its backward end in engageable relation with the front face of said member 26. By backward movement of said carrier 3 to a predetermined point the pin 32 can be brought into engagement with said member 26 to move it about its pivotal connection with said lever 22 when said pin 28 is in latched relation with said slot 30. Such a movement unlatches member 26 from pin 28 and when the upper end of slot 29 registers with pin 28 said spring 18 is permitted to move brake shoe 17 into braking contact with said wheel 14. A lever 33 pivoted to treadle 22 through the connecting rod 34 is also latched and unlatched by member 26 and pin 32. Said lever 33 is connected to means for shutting off and putting on the power to the machine as through an arm for moving a driving belt to and from a driving pulley and an idler pulley, these parts being not shown in the drawing as they are well known elements in machine driving apparatus. Said lever 33 is usually provided with means such as a spring or a weight which tends to move it into the power cut off position but the spring 18 can be considered as means tending to move lever 33 into the power cut off position because they are connected through said rods 21 and 34 and lever 22.

In the use and operation of the machine shown and described for cutting a file blank which tapers from a maximum width at the handle end toward a point or narrower width at the opposite end, the blank is clamped or otherwise held on said carrier 3 in position to be engaged by the file cutter and with the handle end toward the front of the machine. Said lever 4 is moved through handle 7 or through movement of carrier 3 and weight 13 starting position to produce the proper compression on the cutter spring or rubber to secure a cut of proper depth at the commencement of the cutting operation. Said chain 12 is then meshed or engaged with one of said sprocket wheels 11 to secure proper increments of tension on the cutter driving spring or rubber in accordance with the rate of change of width of the file blank between consecutive cuts. During the clamping of a blank and setting of the machine, the machine of course is still, member 26 is unlatched, shoe 17 is held against wheel 14 by spring 18, and lever 33 is in the power cut off position. Said pin 32 is set to engage and move latch member 26 when the end of the file blank reaches the cutter.

After being loaded and set the machine is put into operation by depressing pedal 24 to remove shoe 17 from braking contact with wheel 14, to move lever 33 into the power connecting position, and to move member 26 downwardly until slot 30 registers with pin 28 and spring 31 moves member 26 into position to latch shoe 17 and lever 33 in the operating positions thereof. As is well known in the file cutting machinery art, when the machine is in operation, said carrier 3 will be moved backwardly over the plate 2 and in successive steps with periods of rest between steps and at each period of rest the file cutter is actuated to move against the blank, make a cut therein, and retract out of contact with the blank. As the blank is moved in steps the width becomes increasingly greater and consequently the force needed to make a cut uniform in depth with the previous cut or cuts is necessarily greater. This increase in force is secured by increasing the compression on the cutter driving or impelling spring or rubber through the raising of the outer end of said lever 4. This movement of lever 4 is done in successive steps in the periods when the cutter is stationary and is secured by the successive movements of carrier 3 between cutting strokes on the file blank. This series of actions and functions is continued until the end of the file blank approaches the cutter and said pin 32 comes into contact with and moves latch member 26 until slot 29 registers with pin 28. Spring 18 is released then and will move shoe 17 into braking and stopping contact with the brake wheel 14 and lever 33 will be moved to disengage the power from the machine. The machine being stopped is unloaded, reloaded with a new blank, set for another cutting, and again put into operation.

As many changes could be made in connection with my present invention and many apparently widely different embodiments of the same could be made without departing from the scope thereof, it is intended that all matter contained in the above description or shown in the accompanying drawings shall be interpreted as illustrative and not in a limiting sense.

I claim:

1. In a file cutting machine, in combination, a file blank carrier mounted for movement through a given path, a file cutting member mounted for movement along a fixed line and into and out of cutting contact with a blank on said carrier, means for moving said carrier along said given path and for simultaneously actuating said cutting member, a brake member on said moving means, a brake movable into and out of braking relation with said brake member, a spring tending to hold said brake in braking relation with said brake member, a latch for holding said brake out of braking position and against the action of said spring, said latch being movable to release said brake, and a latch release member on said carrier adapted to engage said latch during movement of said carrier to move it into the brake release position.

2. In a file cutting machine, in combination, a file blank carrier mounted for movement through a given path, a file cutting member mounted for movement along a fixed line and into and out of cutting contact with a blank on said carrier, means for moving said carrier along said given path and for simultaneously actuating said cutting member, a brake member on said moving means, a brake movable into and out of braking relation with said brake member, a spring tending to hold said brake in braking relation with said brake member, a latch for holding said brake out of braking position and against the action of said spring, said latch being movable to release said brake, and a latch release member on said carrier adapted to engage said latch during movement of said carrier to move it into the brake release position, said release member being adjustable with respect to the distance of movement of said carrier toward said latch.

3. A stop mechanism for a file cutting machine of the type which comprises a movable blank carrier, a cutter member having power applying mechanism, and a brake member connected with said power applying mechanism: comprising in combination, a brake in operative relation to said brake member, means tending to hold said brake in braking relation with said brake member, a latch for holding said brake out of braking relation, and a member movable by said carrier adapted to engage said latch at a predetermined position in the movement of said carrier to release the latch and permit said brake to become operative.

4. A stop mechanism for a file cutting machine of the type which comprises a movable blank carrier, a cutter member having power applying mechanism, means adapted to and tending to cut off the power, and a brake member connected with said power applying mechanism; comprising in combination, a brake in operative relation with said brake member, means tending to hold said brake in braking relation with said brake member, a latch adapted to hold said brake out of braking relation and to hold inoperative said power cut off means, and a member movable by said carrier adapted to engage said latch at a predetermined position in the movement of said carrier to release said latch and permit said brake and said power cut off means to become operative.

5. A stop mechanism for a file cutting machine of the type which comprises a movable blank carrier, a cutter member having power applying mechanism, means for progressively varying the amount of power applied to said cutter member including an actuating element, means adapted to and tending to cut off the power, and a brake member connected with said power applying mechanism; comprising in combination, a brake in operative relation with said brake member, means tending to hold said brake in braking relation with said brake member, a latch adapted to hold said brake out of braking relation and to hold inoperative said power cut off means, and a member movable by said carrier adapted to engage said latch at a predetermined position in the movement of said carrier to release said latch and permit said brake and said power cut off means to become operative, and driving connection between said carrier and the actuating element of said power varying means.

6. A stop mechanism for a file cutting machine of the type which comprises a movable blank carrier, a cutter member having power applying mechanism, means adapted to and tending to cut off the power, and a brake member connected with said power applying mechanism; comprising in combination, a brake in operative relation with said brake member, means tending to hold said brake in braking relation with said brake member, a latch adapted to hold said brake out of braking relation and to hold inoperative said power cut off means, and a member movable by said carrier adapted to engage said latch at a predetermined position in the movement of said carrier to release said latch and permit said brake and said power cut off means to become operative, and a treadle for simultaneously moving said brake and said power cut off means out of operative relation and for moving said latch into latching position to hold said brake and power cut off inoperative.

7. A stop mechanism for a file cutting machine of the type which comprises a movable blank carrier, a cutter member having power applying mechanism, means for progressively varying the amount of power applied to said cutter member including an actuating element, means adapted to and tending to cut off the power, and a brake member connected with said power applying mechanism; comprising in combination, a brake in operative relation with said brake member, means tending to hold said brake in braking relation with said brake member, a latch adapted to hold said brake out of braking relation and to hold inoperative said power cut off means, and a member movable by said carrier adapted to engage said latch at a predetermined position in the movement of said carrier to release said latch and permit said brake and said power cut off means to become operative, and driving connection between said carrier and the actuating element of said power varying means, and a treadle for simultaneously moving said brake and said power cut off means out of operative relation and for moving said latch into latching position to hold said brake and power cut off inoperative.

In testimony, that I claim the invention set forth above I have hereunto set my hand this 14th day of May, 1927.

GEORGE DAVIS.